Oct. 5, 1954   H. R. DENTON   2,690,633
METHOD OF MAKING PACKAGES
Filed May 31, 1952
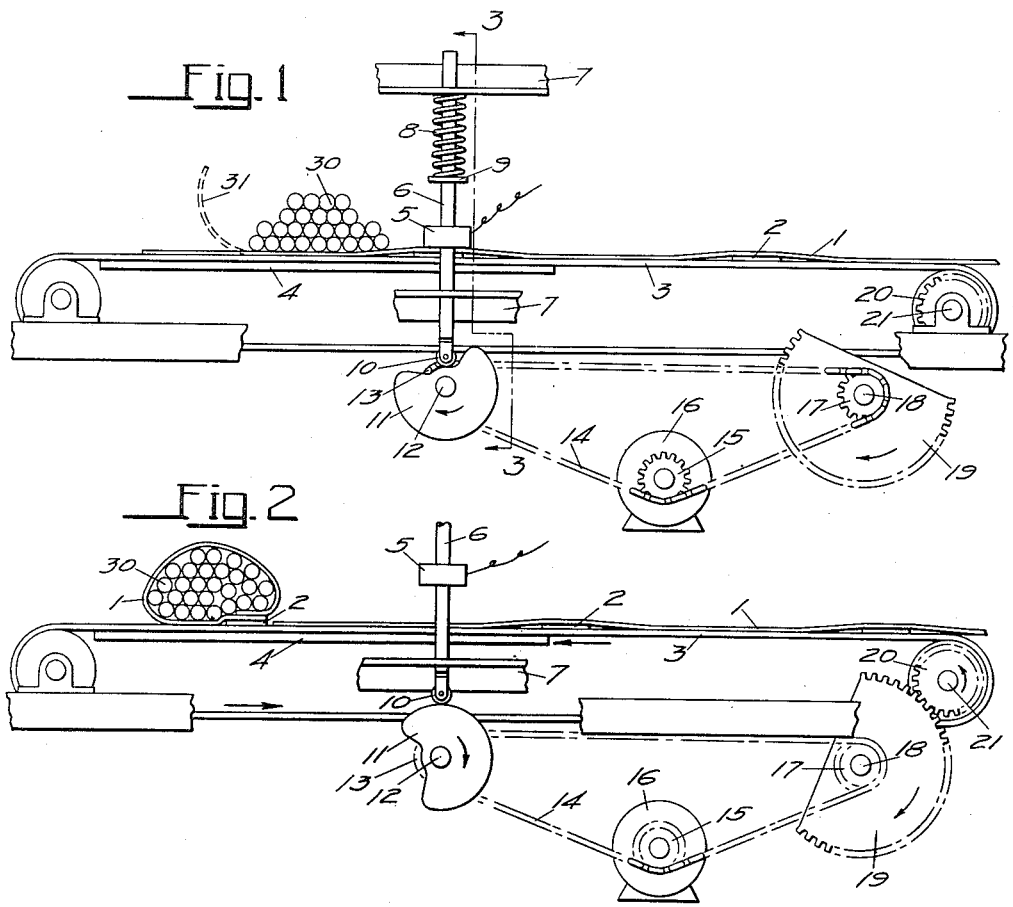
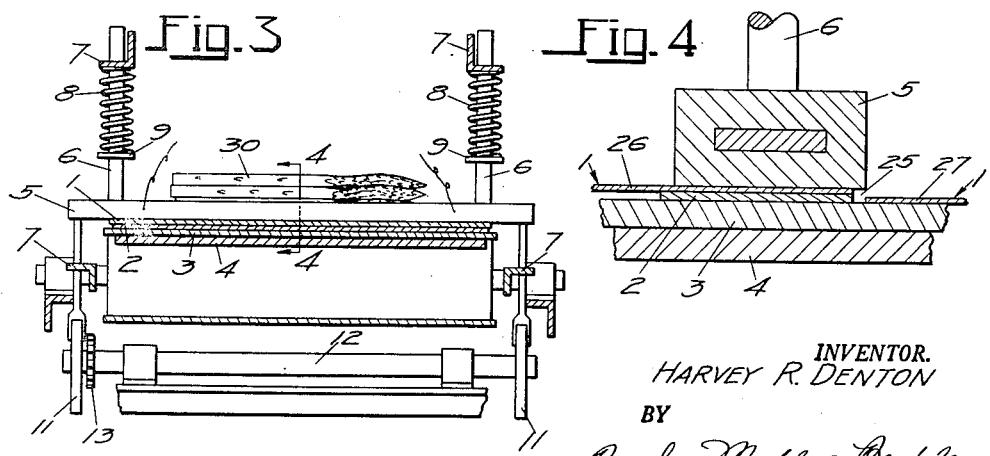
INVENTOR.
HARVEY R. DENTON
BY
Boyken, Mohler & Beekley
ATTORNEYS Patented Oct. 5, 1954

2,690,633

UNITED STATES PATENT OFFICE 2,690,633

METHOD OF MAKING PACKAGES

Harvey R. Denton, Oakland, Calif.

Application May 31, 1952, Serial No. 291,009

3 Claims. (Cl. 53—5)

This invention relates to a package and to the method of making the same, and has for one of its objects the provision of an improved method of forming a package from thin thermoplastic sheet material by heat sealing portions of the sheet together in a manner that reduces the likelihood of injury to the material by reason of excess heat, and that substantially prolongs the period of time that the operation of heat sealing can occur after the source of heat has been removed.

Another object of the invention is an improved method of forming packages from a strip of thermoplastic sheet material by heat sealing wrappers of said material in position enclosing the articles that are wrapped, and in which method the step of separating each wrapper from the strip is accomplished in the single operation of making a localized portion of the wrapper tacky by application of heat thereto for sealing such portion to another for making the package.

A still further object of the invention is the provision of an improved method of joining two portions of a thermo-sealing plastic material together without injury to either part from heat and by application of heat to only one portion thereof and to a reinforcing piece on said one portion in a manner so that said reinforcing member will hold the heated part and will supply heat to the heated portion of the plastic after the source of heat has been removed from said portion to thereby insure a more perfect bond than heretofore without requiring undue haste.

An additional object is the provision of an improved package, particularly where the wrapper of the package would be liable to be injured were the heat applied after the products are enclosed by the wrapper, and a still further object of the invention is a wrapper having a reinforcement for holding it against objectionable wrinkling where somewhat irregular articles are enclosed, and which reinforcement is positioned to be unaffected by any moisture in the articles.

In my United States Letters Patent No. 2,577,183 of December 4, 1951, is disclosed the method of heat sealing two portions of a thermoplastic material, such as chlorinated rubber, rubber hydrochloride, etc., by the application of sufficient heat to one portion to render the heated surface tacky and soft, and then placing the other portion against the hot and tacky portion thereby softening said other portion by heat from the first portion so as to make a secure weld or bond.

This method is satisfactory where there is no likelihood of the tacky and soft portion that has been initially heated cooling off before it can transfer its heat to the part that is to be secured thereto. Also, care must be taken to see that the heating of the first portion has not proceeded to the extent that said portion is so weak that it cannot be safely handled to make the seal.

By the present invention, a materially longer delay can occur between the time the surface of one thermoplastic portion is heated and another portion is applied thereto than in the method as disclosed in said patent, and the same means that this invention provides for enabling such delay also reinforces the soft heated portion so that it can be safely handled even though it has been softened to the point where it could not otherwise be manipulated. Furthermore by the present method and structure the heat sealing operation is made practical under circumstances where it could not be accomplished by previously known methods and structure.

Other objects and advantages will appear in the description and in the drawings.

In the drawings, Fig. 1 is a semi-diagrammatic view of the first step in the method of making a package by the present invention.

Fig. 2 is a semi-diagrammatic view of the second step in said method.

Fig. 3 is an enlarged sectional view taken along line 3—3 of Fig. 1.

Fig. 4 is an enlarged fragmentary sectional view taken along line 4—4 of Fig. 3.

In the drawings, it is to be clearly understood that the apparatus shown is purely illustrative of one means that may be employed and that this invention is in no way to be considered limited to any particular apparatus.

In detail, 1 represents a strip of thin and highly flexible thermoplastic material such as chlorinated rubber, rubber hydrochloride, or any thermoplastic material that may be heat sealed to itself in a manner that is similar to the manner that these specifically named thermoplastics may be heat sealed.

The strip 1 has secured to its underside by any suitable heat resistant adhesive, a plurality of equally spaced bands 2 of cardboard or the like. These bands 2 extend the full width of the strip 1, and usually extend perpendicularly of said strip.

In the drawings, said strip is supported horizontally on the upper reach of a belt conveyor 3, which reach is supported on a rigid plate or table 4.

The bands 2 are next to the belt conveyor 3, therefore the upper surface of the strip 1 does not have any projections or obstructions.

At a point over the path of travel of the strip 1, and the direction of said travel being from right to left as seen in the drawings, is a horizontally disposed heater bar 5 having a conventional heating element therein that may be thermostatically controlled in the usual manner for such heater bars.

Bar 5 extends transversely of the strip 1 and parallel with bands 2 and is supported at its ends on vertically disposed rods 6 that in turn are virtually reciprocable in upper and lower guides 7. Rods 6 may be spring urged downwardly at all times by springs 8 respectively reaching between a collar 9 on each rod and upper guide 7.

The lower end of each rod 6 may carry a cam follower 10 that engages a cam 11 secured on shaft 12. Shaft 12 in turn has a sprocket wheel 13 thereon that is driven by a sprocket chain 14, which chain 14 is driven by a motor driven sprocket wheel 15 connected with a motor 16 through a conventional reduction gear box (not shown) but which may be between the wheel 15 in Figs. 1, 2 and the motor.

The belt 3 may be intermittently driven by chain 14, which chain passes over a sprocket wheel 17 on a shaft 18. On shaft 18 is a segmental or interrupted gear 19 the teeth of which are adapted to mesh with the teeth of a gear 20 on pulley shaft 21 that in turn supports one of the pulleys over which the belt 3 extends.

In operation, upon actuation of the motor 16 the belt 3 will be intermittently driven in the direction of the arrow. Cams 11 are identical and when the high sides of said cams are in engagement with the followers 10 on rods 6, the heating bar 5 will be elevated off the strip 1, and only when so elevated will the teeth of gear 19 be in mesh with the teeth of pinion 20 for driving the belt 3. When the followers 10 engage the low sides of cams 11 the teeth of gear 19 are not in mesh with the teeth of pinion 20 and the belt 3 and strip 1 are stationary and the heating bar is lowered so as to be held against the strip 1 under the tension of springs 8.

The driving arrangement for the belt and the actuating means for the heater bar are so arranged relative to the spacing between bands 2 on strip 1 that the heater bar will engage the strip 1 over each band 2 and slightly projecting from the trailing edge of each band as indicated at 25 (Fig. 4) when the belt is stationary.

The material of strip 1 has the characteristics of cleanly separating under the influence of a certain amount of heat, unless some means is provided for conducting the heat away. As seen in Fig. 4 the leading piece 26 of thermoplastic material 1 has been separated from the trailing piece 27 along the trailing edge of the backing band, but the backing band 2 functions to conduct the heat away fast enough to prevent separation where the material is backed by the band. During this time the portion of the leading piece 26 that is engaged by the heating bar and backed by the band becomes softened and tacky.

At this point the operator may position asparagus 30 or similar articles on the piece 26 and wrap the piece 26 around said articles as indicated in dash lines 31 (Fig. 1). Piece 26 may be drawn slightly taut around articles 30 before bar 5 is elevated, after which, the previously leading edge of sheet 26 is brought into engagement with the hot tacky portion of the sheet that is over band 2. It is obvious that the hot tacky portion of sheet 26 now derives heat from band 2 for transfer to the lapped marginal portion of sheet 1 that overlies the tacky trailing portion. The added heat that is supplied by band 2 makes possible a delay in the lapping of the leading and trailing marginal portions of sheet 26 longer than were the band not provided. Furthermore, the hot tacky trailing portion may be made as soft as desirable since it is supported and reinforced by the band 2.

After the leading and trailing marginal portions of sheet 26 are together, the said leading portion will quickly fuse with the portion on said band, and the weight of the articles 30 pressing downwardly on the lapped portions will hold them together until they are cooled, and will also expedite the cooling. The fact that a more rapid fusing action occurs than were the band 2 to be omitted, makes it practical to permit the rapid cooling of the lapped portions of the thermoplastic sheet, since the cooling must not occur until the lapped portions are fused together.

It will now be seen that the articles 30, in this case asparagus, or they may be rhubarb, green onions etc., and the wrapper consisting of sheet 26, form a package in which the moisture from said article 30 cannot effect the band between the lapped ends of the sheet 26, nor can it reach the band 2 or the glue that secures the band to the wrapper. Furthermore the band 2 holds the wrapper against wrinkling, and provides a space for printed matter.

As the condition of the wrapper when the package reaches the retailers is of the utmost importance, it will be manifest that the present method and structure positively insures against the label (band 2) being injured or separated, from the wrapper by moisture from the articles enclosed by the wrapper, and the label also reinforces the wrapper and holds it against wrinkling without obstructing the view of the contents from any side except the narrow portion covered by the band 2.

The step of simultaneously separating the leading wrapper 26 from the remainder of the strip while rendering the trailing portion of the wrapper 26 tacky, is an important step since it not only speeds up the operation but it eliminates the use of a cutter and the troubles that are inherent in the use of cutting knives. Where cutters are required they become dull and in many instances tear or distort the thermoplastic material, the latter being relatively easily stretched.

The pre-heating of the thermoplastic material before completing the wrapping operation eliminates the use of a heater against the contents of the wrapper, which would injure the contents in many instances.

The band 2 performs the additional and valuable function of preventing the tacky portion of the sheet, after the package has been formed, from adhering to an adjoining package. This has been one of the difficulties experienced in attempts to immediately crate or box packages that have just been heat sealed. The practice heretofore has been to either wait until the sealed portions have cooled to the degree where they will not stick to anything that comes into engagement therewith, or to incur the expense of artificially cooling the sealed portion so as to expedite the time of cooling.

With the present structure, the band positively prevents the adhesion.

I claim:
1. The method of forming a wrapper from a sheet of highly flexible, thermoplastic material that has a reinforcing band of other non-plastic material secured against a marginal portion thereof comprising the steps of; supporting said marginal portion on said band and applying heat from a source thereof above said portion to said band by conduction through said portion until said marginal portion is tacky and until the temperature of the surface of the band supporting said portion is substantially the same temperature as that of said portion, then removing said portion and said band from the influence of said source and immediately thereafter bringing an untreated part of said sheet against said portion for transfer of heat thereto from said portion and from said band until said part is fused to said portion.

2. The method of forming a packaged product from a sheet of highly flexible, thermoplastic material having a stiffening band secured across one end portion thereof; comprising the steps of; heating said portion and said band from a source of heat until said portion is tacky, then wrapping said sheet around a product to be enclosed and placing the marginal part of said sheet that is opposite said portion in direct heat transfer relation with said portion with said part and said portion between said product and said band and with said part nearest said product, holding said part in said relationship until heat transferred to said part from said portion and from said band has softened said part and has caused its fusion with said portion.

3. The method of forming reinforced wrappers of highly flexible, thermoplastic material from a strip thereof that comprises the steps of; moving said strip longitudinally thereof along a path of travel in one direction with equally spaced stiffening bands secured to one side thereof extending transversely thereacross, applying heat directly against the portion of said strip that lies against said band and against the part of the strip that is unsupported by the band and that is along the trailing edge of said band, the heat so applied being sufficient to render the said portion tacky and to cause separation of said part whereby the said strip will be separated by said heat into sheets each having a reinforcing band along the trailing edge thereof supporting a tacky portion in condition for fusion with an unheated portion of said thermoplastic material.

References Cited in the file of this patent
UNITED STATES PATENTS

| Number | Name | Date |
|---|---|---|
| 1,472,443 | Titus | Oct. 30, 1923 |
| 1,643,091 | Rosenthal et al. | Sept. 20, 1927 |
| 2,109,527 | Fenton | Mar. 1, 1938 |
| 2,271,632 | Diehl | Feb. 3, 1942 |
| 2,303,352 | Goldberg | Dec. 1, 1942 |
| 2,554,841 | Rumsey | May 29, 1951 |